UNITED STATES PATENT OFFICE.

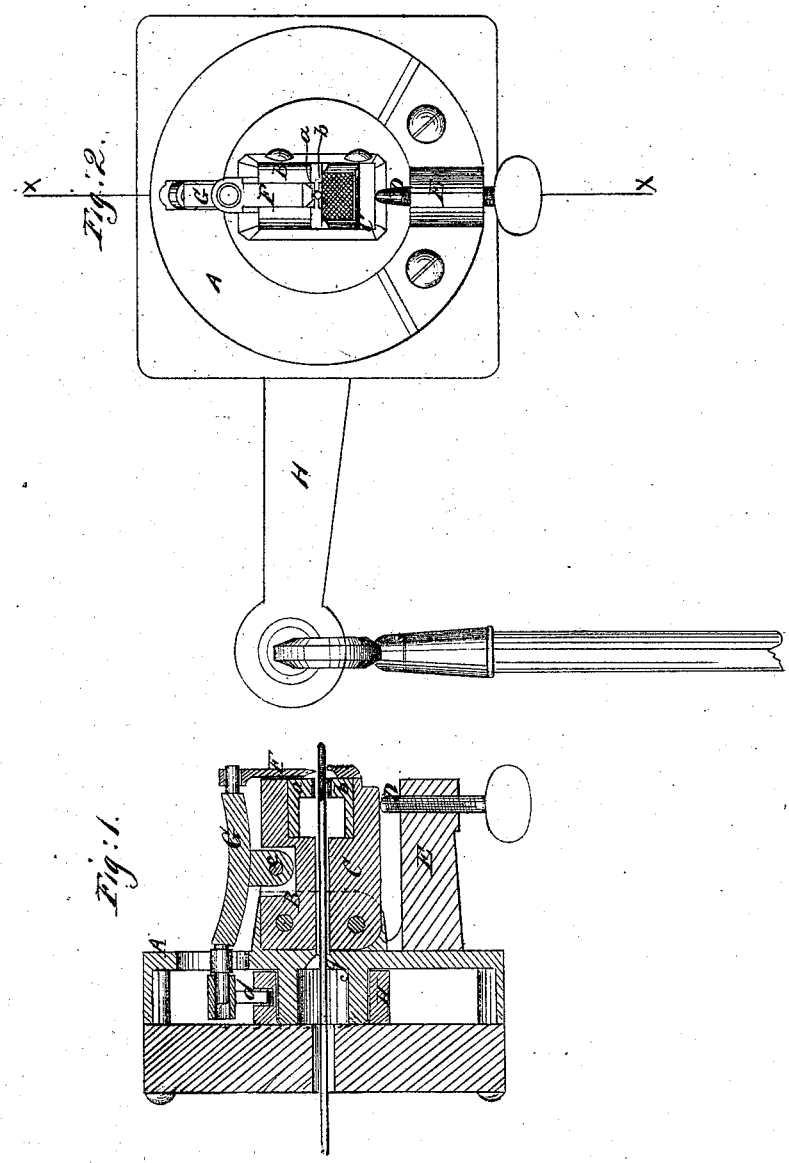
J. Galli,
Pegging Machine.
No. 81,620.
Patented Sep. 1, 1868.
Witnesses.
Inventor.
Joseph Galli

JOSEPH GALLI, OF SAN FRANCISCO, CALIFORNIA.

IMPROVED MACHINE FOR MANUFACTURE OF SCREWED BOOTS.

Specification forming part of Letters Patent No. 81,620, dated September 1, 1868.

*To all whom it may concern:*

Be it known that I, JOSEPH GALLI, of the city and county of San Francisco, State of California, have invented an Improved Machine for the Manufacture of Screwed Boots and Shoes; and I do hereby declare the following description and accompanying drawings are sufficient to enable any person skilled in the art or science to which it most nearly appertains to make and use my said invention or improvement without further invention or experiment.

The object of my invention is to provide an improved machine for screwed boots, by the use of which the screw is formed on the wire as it comes from the reel, and immediately before it enters the sole, so that there is no danger of damage to the screw before it reaches or penetrates the leather. The tool by which the screw is severed as soon as it is put in, is so placed as to cut it close to the sole, thus finishing the work at once, while by working it perpendicularly, and also moving the die for different sizes in the same manner, it is rendered much more convenient for introducing the screws to any part of the sole.

To more fully explain my invention, reference is had to the accompanying drawings, and the letters marked thereon, forming a part of this specification, of which Figure 1 is a side sectional elevation of my machine. Fig. 2 is a front view.

Similar letters of reference in each of the figures indicate like parts.

A is a plate to which the different parts of the machine are attached, and which may be fastened to a frame or table. From the front of this plate two arms or jaws, B and C, extend, the upper of which is rigid, while the lower one, C, is hinged, so as to move up and down, being operated by the screw D passing through the arm E. By this device the screw-plates are changed for large or small wires.

The screw-plate has one part, *a*, fastened to the jaw B, and the other part, *b*, to the jaw C, as shown.

The wire is brought by the proper machinery from the reel, and passes through an opening, *g*, in the plate A, and between the jaws B and C, until it reaches the screw-plate, through which it is forced, so as to cut the thread. After leaving the plate it passes under the cutter F and immediately enters the leather, into which it is turned as far as necessary, when the knife F is forced down upon it, cutting it off close to the sole. The knife may be either straight, as shown, or so curved as to cut the end of the screw pointed, to facilitate its entering the leather. This knife or cutter is operated by an arm, G, which is pivoted at *c* to the jaw B, and extends back through the plate A, where it is connected by a link, *d*, to the end of the arm H, by which it is operated, a rod connecting the arm with a treadle for the foot.

By constructing my machine in this manner I am enabled to greatly facilitate the work, as the construction allows the boot or shoe to be moved in any direction, as its shape requires, while by the screw-plate being placed at the extremity of the jaws B and C the screw enters the leather as soon as formed, with no possibility of damage, and is finished by the cutter at once.

Having thus described my invention, what I claim as new, and desire to secure by Letters Patent, is—

1. The rigid jaw B, and movable jaw C, operated from below, attached perpendicularly to the plate A, and carrying the screw-plate *a b* at their outer end, the whole constructed and operated substantially as and for the purpose herein described.

2. The cutter F, working close to the sole, together with its operating-lever G, link *d*, and arm H, constructed and operating substantially as described.

In witness whereof I have hereunto set my hand and seal.

JOSEPH GALLI. [L. S.]

Witnesses:
J. L. BOONE,
GEO. H. STRONG.